UNITED STATES PATENT OFFICE.

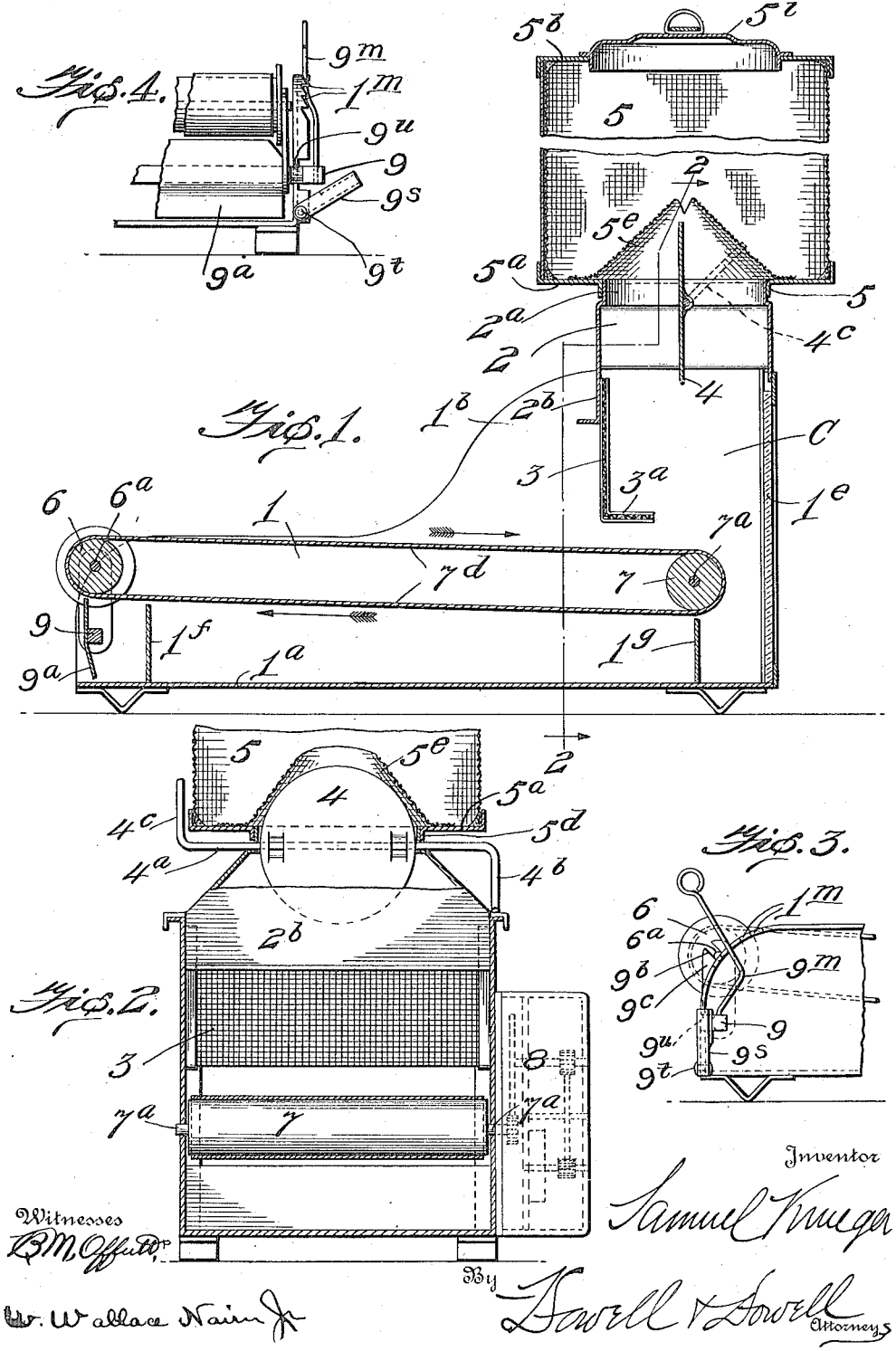

SAMUEL KRUEGER, OF FREDERICKSBURG, TEXAS, ASSIGNOR TO ROTARY FLY-TRAP COMPANY, OF HOUSTON, TEXAS, A CORPORATION OF TEXAS.

FLY-TRAP.

1,220,860.  Specification of Letters Patent.  Patented Mar. 27, 1917.

Application filed January 29, 1916. Serial No. 74,980.

*To all whom it may concern:*

Be it known that I, SAMUEL KRUEGER, a citizen of the United States, residing at Fredericksburg, in the county of Gillespie and State of Texas, have invented certain new and useful Improvements in Fly-Traps; and I hereby declare that the following is a full, clear, and exact description thereof, reference being had to the accompanying drawings, which form part of this specification.

The present invention is an improvement upon the insect trap shown in Patent No. 1,048,082, granted to me December 24, 1912, and the objects of the present invention are to simplify the construction of such traps, enhance their utility and lessen the cost of manufacture thereof.

The invention provides a trap of simple and inexpensive construction by which insects, and particularly flies, while feeding may be moved into a trapping chamber and in attempting to escape therefrom they pass into a holder from which they cannot escape, and such holder may readily be removed when desired and the flies therein killed.

A practical embodiment of the invention is illustrated in the accompanying drawings and will be hereinafter fully described, and the novel features thereof summarized in the claims.

In the drawings:

Figure 1 is a longitudinal sectional elevation of a complete fly-trap;

Fig. 2 is a transverse sectional view on the line 2—2, Fig. 1;

Figs. 3 and 4 are detail views illustrating the apron adjusting devices.

As illustrated the trap comprises a base portion containing the trapping devices, and a removable holder into which the trapped flies pass.

The base portion is preferably formed of sheet metal, and has opposite side walls 1 and a bottom $1^a$. Between the side walls 1 and adjacent the front and rear ends of the base are transverse partition plates $1^f$, $1^g$, the space between which forms a receptacle in which may be placed any suitable bait. The front end of the casing may be closed by a plate $9^a$ preferably attached to a rock shaft 9 journaled in the side walls 1. One end of shaft 9 may be removably engaged in a slot $9^u$ in the side wall—and retained therein by a keeper $9^s$ pivoted to the base as at $9^t$ (Figs. 3 and 4). This enables the shaft, roller thereon and apron, hereinafter explained, to be readily removed and replaced when it is desired to fill or empty the bait chamber.

The side walls 1 are extended upwardly as at $1^b$ adjacent one end of the trap to form the sides of a trapping chamber C and the rear wall of this chamber is formed by a transparent plate $1^e$, of glass or other suitable material.

Mounted upon the upwardly extended portions $1^b$ of the side walls, is a hood 2 which closes the upper part of the trapping chamber. This hood has a preferably annular opening in its top surrounded by a collar $2^a$. The opening in the hood 2 can be closed by a valve 4 mounted on a rod $4^a$ that extends outside the hood and has its ends $4^b$ and $4^c$ bent oppositely in such manner that when the valve is open the end $4^b$ will contact the top of the hood and arrest the valve in open position (see Fig. 2) and when the valve is closed the end $4^c$ will contact the top of the hood and arrest the valve in closed position. When the top is in use the valve should be open.

The front wall $2^b$ of the hood depends between the upwardly extended portions $1^b$ of the side walls; and attached to, and depending from the lower edge of this wall $2^b$ is a screen 3 preferably formed of light wire mesh, and at the lower edge of this screen is an inwardly and rearwardly projecting flange $3^a$ by which any flies within the trapping chamber that might walk down screen 3 would be stopped, and instead of passing around and under the flange $3^a$ of the screen would pass back into the hood.

Above the hood is a removable holder 5 of any suitable kind; but is shown as formed of a cylinder of screen wire and sheet metal heads $5^a$, $5^b$. The bottom head $5^a$ has an opening surrounded by a depending flange $5^d$ adapted to telescope the collar $2^a$ and retain the holder in position on the hood 2. A conical cover $5^e$ is placed over the opening in the bottom plate $5^a$, such cover having a slit in its top through which the flies will readily enter the holder from the trapping chamber below, but they will not attempt to escape through such slit. The opening in the top plate $5^b$ of the holder may be closed by a removable cover $5^i$.

At the front end of the base is a roller 6 having trunnions 6ª detachably mounted in slots 9ᵇ in the upper ends of arms 9ᶜ attached to shaft 9; and at the rear end of the base and within the trapping chamber is a similar roller 7 whose trunnions 7ª are journaled in the side walls of the base. Mounted upon and between these rollers is an endless apron 7ᵈ. The roller 7 is adapted to be slowly rotated by means of clock mechanism, or other suitable means, indicated conventionally at 8, as described in my aforesaid patent to move the apron 7ᵈ slowly so that the upper run of the apron moves toward and within the trapping chamber.

The apron 7ᵈ may be tensioned by shifting roller 6 to or from roller 7, and by any suitable devices. As shown in Figs. 3 and 4 the shaft 9 may be provided with an arm 9ᵐ on one end which arm can be engaged with any of a series of notches 1ᵐ attached to, or formed in, the flange of the adjacent wall as shown.

The chamber or compartment formed between the partitions 1ᶠ and 1ᵍ may be utilized to hold any form of bait, the odor of which will attract the flies; and the rear partition 1ᵍ serves as a guard or stop to prevent any flies which may have been drawn into the trapping chamber from escaping under the apron.

In use the apron 7ᵈ is coated lightly with a substance which will attract flies, and moved slowly by the motor, so that flies feeding on the apron will not be frightened by its movement and will be carried under the screen 3 into the trapping chamber, and when therein will be frightened off the apron by its turning around roller 7ª, or by contacting with the upper end of the rear partition 1ᵍ; the trapped flies will seek to escape through the transparent wall 1ᵉ and walk upward therein into the hood 2, and eventually will pass through the opening into the holder 5. When a number of flies have collected in the holder the valve 4 is closed and the holder removed and the flies killed in any convenient manner. The screen flange 3ª is sufficiently elevated above the apron to avoid frightening the flies as the apron moves thereunder, so that they make no effort to leave the apron until they are in the trapping chamber C; then the flies attempt to escape through the transparent plate, and are directed into the holder, as described; the screen 3 preventing the flies escaping at the front of the trapping chamber.

The trap is very efficient in action and requires little attention after being baited and the apron set in motion.

What I claim is:

1. A fly trap comprising a trapping chamber having a transparent rear wall and a traveling apron extending into said chamber substantially parallel with the bottom thereof, together with a removable hood closing its top, and a depending screen closing the front of said chamber above said apron; said screen having at its lower end a rearwardly projecting portion slightly separated from said apron and adapted to prevent frightening the flies as the apron moves thereunder and also to direct any flies crawling down said screen rearwardly into said chamber.

2. In a fly trap, a trapping chamber having side walls and bottom, and an endless apron extending into said chamber, substantially parallel with said bottom, together with means for mounting and tightening said apron and permitting it to be readily removed; said means comprising a rock shaft having oscillatory arms with open-ended slots in their upper ends, a roller having its bearings in the slotted portions of said arms, a second roller journaled within the trapping chamber, and means for adjusting said rock shaft so as to tighten or loosen the apron and permit it to be removed.

3. A fly trap comprising a trapping chamber having a detachable hood closing its upper end, a rear transparent wall, a traveling belt extending into said chamber and a substantially L-shaped screen forming the front wall of said chamber above said belt; said screen having the lower portion thereof projecting into said chamber slightly above said belt, whereby any flies within the trapping chamber walking down said screen will be directed toward said transparent wall and thus prevented from escaping.

In testimony that I claim the foregoing as my own, I affix my signature in presence of two witnesses.

SAMUEL KRUEGER.

Witnesses:
G. M. SEAMAN,
B. T. PERKINS.

Copies of this patent may be obtained for five cents each, by addressing the "Commissioner of Patents, Washington, D. C."